Feb. 7, 1967 G. H. KEATS 3,303,490

PHOTOCONDUCTIVE CODED DISC ENCODER

Filed Feb. 28, 1963

INVENTOR.
GEORGE H. KEATS

BY Edward R. Hyde Jr.

ATTORNEY 3,303,490

PHOTOCONDUCTIVE CODED DISC ENCODER

George H. Keats, Stamford, Conn., assignor to The Perkin-Elmer Corporation, Norwalk, Conn., a corporation of New York Filed Feb. 28, 1963, Ser. No. 261,801
10 Claims. (Cl. 340—347)

Figure 1:
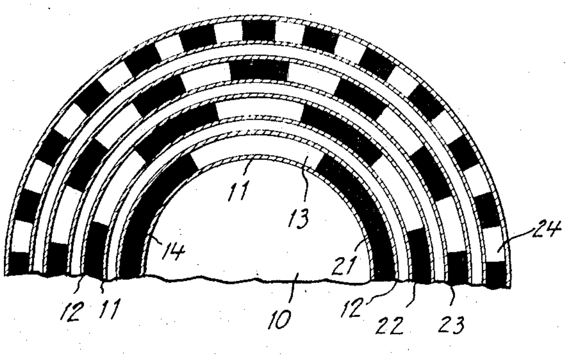

This invention relates to an optical encoder in which rotation of a shaft desired to be measured, is converted to digital output.

Generally, according to my invention, I provide a disk cooperating with the shaft, the rotation of which is to be indicated digitally. This disk is provided with a multiplicity of concentric tracks radially disposed about the center, and each track is of predetermined radial width and is made up of alternate segments of light sensitive conducting portions, and insulating portions.

To provide output signals, each track consists of an inner conducting circular portion, and an outer conducting circular portion radially spaced from the inner conducting portion, and each track is made up of alternate segments of light sensitive material, the conductivity of which is a function of the illumination falling on it. The light sensitive material of each segment extends from the inner conducting ring to the outer conducting ring of each track, and a source of voltage is connected in circuit from the inner to the outer conducting ring, together with appropriate measuring instruments to determine the voltage drop or current flow through the circuit.

The tracks are illuminated through a narrow radially extending slit or slits, and, as will be understood, as relative rotation between the slit and disk occurs, when the light falls on the light-sensitive element of a track, the conductivity of the segment increases, and the voltage or current through the light-sensitive segment changes, giving an output which can be detected and utilized for the purpose desired.

In accordance with the preferred form of my invention, the disk is stationary, and the arm carrying the lamp and slit is mounted for rotation about the center of the disk. By making the disk stationary and the arm carrying the slit rotatable about the center of the disk, the use of slip rings, brushes or the like in the output circuit is avoided, thus providing a higher signal to noise output ratio and increased output signal reliability, and freedom from stray and spurious signals.

In the arrangement of segments in the various tracks, any particular digital system may be used as desired, as suited to the particular purpose of the equipment. In the form herein illustrated, I have shown a binary arrangement, i.e., one in which the number of segments in each successive track outwardly is double the number in the next inward track. This is particularly useful in converting analogue information to digital output to be supplied to a computer, because, as is well known, many digital computers are arranged to operate on the binary system. It will be understood, however, that the number of segments in the tracks may be arranged in other systems, for example, decimal, octal, biquinary, or even arbitrary.

Preferably, the output from each track is taken off on a separate lead, giving a separate output for each track. The arm carrying the slit may provide for illumination of all tracks, or one or more of them, or a plurality of arms may be provided, each carrying a slit, and the arms may rotate at different speeds.

In the case of more than one arm, one might cover the most significant digit track, and rotate it ten times as fast as the other or others, or, in the case of several, each may rotate at a different speed.

From the foregoing, it will be understood that among the objects of my invention are:

To provide an optical encoder in which the tracks are formed of alternate segments of insulating and light-sensitive conductors;

To provide such an encoder which is free of moving contacts, slip rings, brushes, and the like, and is characterized by low noise and low spurious output signals;

To provide such an encoder in which the tracks themselves form the light sensitive elements, thereby simplifying the construction and operation of the encoder and reducing the number of parts required.

Still other objects and advantages of my invention will be apparent from the specification.

Figure 2:
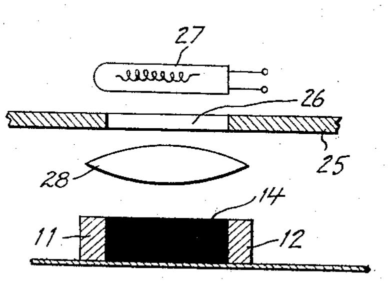
Figure 3:
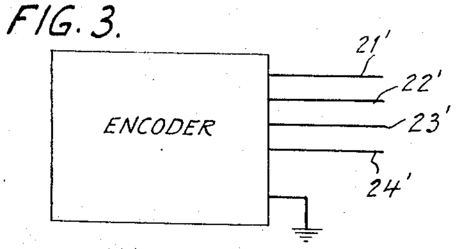
Figure 4:
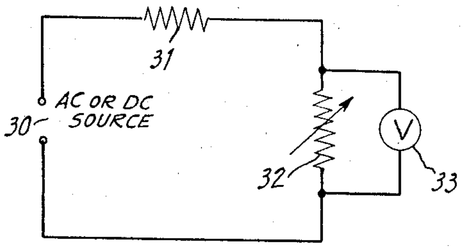
Figure 5:
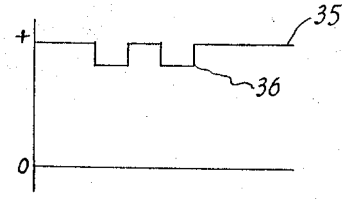
Figure 6:
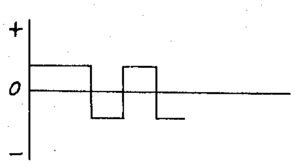

The features of novelty which I believe to be characteristic of my invention are set forth with particularity in the appended claims. My invention itself, however, both as to its fundamental principles and its particular embodiments, will best be understood from the specification and accompanying drawing, in which:

FIG. 1 is a top plan view of an encoder disk in accordance with my invention,

FIG. 2 is a detail sectional view showing a portion of the disk with its light sensitive element, and the associated arm with its slit and the lamp for illuminating the light-sensitive element, FIG. 3 is a block diagram showing one form of output circuit which I may employ, FIG. 4 is an equivalent circuit diagram of the output circuit of my encoder, FIG. 5 is a curve showing the voltage output of my encoder as measured in the output circuit as the slit-carrying arm rotates, and FIG. 6 is a curve showing the output after removal of the non-varying output to convert the output to pulse form.

Referring now more particularly to FIG. 1, 10 designates the encoder disk, preferably of insulating material, which may be of the type used in printed circuit boards, or may be glass or other suitable material. Each track is preferably circular and the inner and outer track rings 11 and 12 respectively are conductors such as copper or silver foil, which may be formed in place by the well known printed circuit techniques.

The annular space between rings 11 and 12 carries alternating segments 13 and 14, 13 being insulating, and 14 carrying a layer of light sensitive material, such as selenium, CdS or CdSe, or other material, the conductivity of which increases when illuminated.

In the form shown, there are four annular tracks 21, 22, 23 and 24, each formed as already described, and it will be noted that the segments are set up in binary progress, the segments in track 22 being twice the number of those in 21, 23 twice those in 22, and 24 twice those in 23, but it will be understood that this is merely by way of example. Any number of tracks may be provided as desired, limited only by the size of the disk and the ability to deposit the conductive segments.

The width of the tracks and the length and width of its cooperating slit should be chosen to obtain the maximum change of resistance as light falls on the sensitive element. Generally, the slit should be relatively long and narrow, with radially extending edges. The arm 25 having slit 26 also carries lamp 27, and a lens system 28 (schematically illustrated) may be used if desired to focus an image of the slit on the track. The wave length of the light emitted by lamp 27 will preferably be selected to afford maximum change of resistance of the light-sensitive element. For example, if the light-sensitive element is most sensitive to ultraviolet, the lamp 27 will preferably be an ultraviolet lamp.

Referring now to FIG. 3, one side of each of the circuits is grounded as shown, and the output from tracks 21, 22, 23 and 24 may be taken off through conductors 21′, 22′, 23′ and 24′ respectively.

Referring now to FIG. 4, a source of voltage 30, which may be either A.C. or D.C., is connected in series with each track, through a limiting resistor 31, and through the light sensitive element indicated as variable resistance 32 and an indicator 33 shown as a voltmeter, is connected to read the voltage across variable resistance 32.

How the circuit operates will now be described. The resistance of limiting resistor 31 is chosen to be relatively high with respect to the resistance of the track, indicated at 32. The resistance of each track is the parallel resistance of all the light sensitive elements. When no segment is illuminated, the resistance of track 32 will be a constant maximum and the voltage read at 33 will have a constant maximum value as at level 35 in FIG. 5. As a segment of the light-sensitive material is illuminated, the resistance of that segment decreases, and the voltage read by 33 will drop as indicated by the dips 36, each dip indicating the passage of light over a light-sensitive segment.

In order to get rid of the constant voltage 35, and separate out the pulses for use, the output shown in FIG. 5 may be biased in any well known manner, to give the wave form in FIG. 6. While the pulses in FIG. 6 are shown as negative going, they may be fed to an inverter (well known) to give positive-going pulses if desired.

In preparing the encoder disk according to my invention, the light-sensitive material should have a light/dark resistance of probably 50:1, and improvement in edge definition could be effected by developing or depositing each track as a continuous track photosensitive material, and then overlaying finely etched insulation to form the insulating segments, the insulation being preferably opaque to the radiation employed. Also, while I have used the terms "light," "light-sensitive," and "illumination," it should be understood that I do not wish to be restricted to visible light, as other forms of radiant energy may be employed, such as infrared and ultraviolet.

In the foregoing, I have described certain preferred embodiments of my invention, and the best mode presently known to me of practicing the same, but it should be understood that modifications and changes may be made without departing from the spirit and scope of my invention.

I claim:

1. An encoder comprising in combination, an element having a track made up of alternate sections of light-sensitive material the electrical conductivity of which changes upon impingement of light and insulation representing a coded digital pattern, means including input shaft means for progressively illuminating successive light-sensitive portions of said track, and means for detecting changes in conductivity of said track as said portions are successively illuminated for producing a digital signal in accordance with the position of said input shaft means.

2. An encoder as claimed in claim 1 in which said light-sensitive material has a conductivity which increases when said material is illuminated.

3. An encoder comprising, in combination, an element having a track defined by a pair of spaced conductors, the space between said conductors carrying alternate sections of light-sensitive material and insulation in a binary coded pattern, means including input shaft means for progressively illuminating said sections, and means for detecting a change in conductivity of said track as said portions are successively illuminated for producing a digital signal representative of said input shaft means position.

4. An encoder comprising, in combination, a disk having a plurality of concentric tracks, each track made up of alternate sections of light-sensitive material and insulation in a binary coded pattern, means including input shaft means for progressively illuminating successive light-sensitive portions of said tracks, and means for detecting changes in conductivity of said tracks as said portions are successively illuminated for producing a digital signal representative of the shaft position.

5. The encoder claimed in claim 4 with an output circuit associated with each of said tracks.

6. The encoder claimed in claim 4 in which the number of sections in each of said tracks bears a predetermined ratio to the number of sections in the adjacent track.

7. The encoder claimed in claim 4 in which the number of sections in each of said tracks is an integral multiple of the number of sections in the next adjacent inner track.

8. The combination claimed in claim 4 in which the number of sections in each track is double the number of sections in the next adjacent inner track.

9. The encoder claimed in claim 1 in which said light-sensitive sections are formed of selenium.

10. The encoder claimed in claim 4 in which said disk is stationary and said illuminating means is rotary about the center of said disk.

References Cited by the Examiner

UNITED STATES PATENTS

| | | | |
|---|---|---|---|
| 3,023,406 | 2/1962 | Jones | 340—347 |
| 3,024,986 | 3/1962 | Strianese | 340—347 |

OTHER REFERENCES

IBM Technical Disclosure Bulletin, vol. 1, No. 1 June 1958 pages 27—28.

MAYNARD R. WILBUR, *Primary Examiner.*

MALCOLM MORRISON, DARYL W. COOK, *Examiners.*

D. M. ROSEN, K. R. STEVENS, *Assistant Examiners.*